(12) United States Patent
Wolff et al.

(10) Patent No.: US 10,276,181 B2
(45) Date of Patent: Apr. 30, 2019

(54) SYSTEM AND METHOD FOR ADDRESSING ACOUSTIC SIGNAL REVERBERATION

(71) Applicant: Nuance Communications, Inc., Burlington, MA (US)

(72) Inventors: Tobias Wolff, Neu-Ulm (DE); Lars Tebelmann, München (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/695,059

(22) Filed: Sep. 5, 2017

(65) Prior Publication Data
US 2018/0047408 A1 Feb. 15, 2018

Related U.S. Application Data

(63) Continuation of application No. 14/784,510, filed as application No. PCT/US2013/036623 on Apr. 15, 2013, now Pat. No. 9,754,604.

(51) Int. Cl.
*G10K 15/08* (2006.01)
*H04B 3/20* (2006.01)
(Continued)

(52) U.S. Cl.
CPC ......... *G10L 21/0216* (2013.01); *H04M 9/082* (2013.01); *H04R 3/00* (2013.01);
(Continued)

(58) Field of Classification Search
CPC .. G01H 7/00; G10H 1/0091; G10H 2210/281; G10K 15/08
(Continued)

(56) References Cited

U.S. PATENT DOCUMENTS 7,286,674 B2 * 10/2007 Karjalainen ........... H03G 5/165
381/66
7,433,481 B2 * 10/2008 Armstrong ........... H04R 25/356
381/312
(Continued)

FOREIGN PATENT DOCUMENTS

WO 2014171920 A1 10/2014

OTHER PUBLICATIONS

Non-Final Office Action issued in related U.S. Appl. No. 14/784,510 dated Sep. 12, 2016.
(Continued)

*Primary Examiner* — George C Monikang
(74) *Attorney, Agent, or Firm* — Brian J. Colandreo; Michael T. Abramson; Holland & Knight LLP

(57) ABSTRACT

A method, computer program product, and computer system for addressing acoustic signal reverberation is provided. Embodiments may include receiving, at one or more microphones, a first audio signal and a reverberation audio signal. Embodiments may further include processing at least one of the first audio signal and the reverberation audio signal. Embodiments may also include limiting a model based reverberation equalizer using a temporal constraint for direct sound distortions, the model based reverberation equalizer configured to generate one or more outputs, based upon, at least in part, at least one of the first audio signal and the reverberation audio signal.

20 Claims, 13 Drawing Sheets

(51) Int. Cl.
  *G10L 21/0216* (2013.01)
  *H04M 9/08* (2006.01)
  *H04R 3/00* (2006.01)
  *G10L 21/0208* (2013.01)

(52) U.S. Cl.
  CPC ............ *G10L 2021/02082* (2013.01); *G10L 2021/02165* (2013.01)

(58) Field of Classification Search
  USPC .............................................. 381/61, 63, 66
  See application file for complete search history.

(56) References Cited

U.S. PATENT DOCUMENTS

| | | | | |
|---|---|---|---|---|
| 8,041,045 | B2* | 10/2011 | Burwen | H04S 7/305 381/63 |
| 9,754,604 | B2 | 9/2017 | Wolff et al. | |
| 2009/0103749 | A1* | 4/2009 | Goodwin | H04R 3/005 381/92 |
| 2010/0150375 | A1* | 6/2010 | Buck | G10L 25/78 381/94.1 |
| 2010/0158268 | A1* | 6/2010 | Marton | H04N 7/142 381/92 |

OTHER PUBLICATIONS

International Search Report issued in related PCT Application No. PCT/US2013/036623 dated Aug. 2, 2013.

* cited by examiner

SYSTEM AND METHOD FOR ADDRESSING ACOUSTIC SIGNAL REVERBERATION

RELATED APPLICATIONS

The subject application is a continuation application of U.S. patent application with Ser. No. 14/784,510, filed on Oct. 14, 2015, which is a U.S. National Stage Application of International Application No. PCT/US2013/036623, filed on Apr. 15, 2013, the contents of which are herein incorporated by reference in its entirety.

TECHNICAL FIELD

This disclosure relates to signal processing and, more particularly, to a method for addressing acoustic signal reverberation.

BACKGROUND

Room reverberation often degrades the quality of automatic speech recognition ("ASR") algorithms. Therefore, speech enhancement algorithms aim to suppress the reverberation. In strongly reverberant rooms such as living rooms for instance, this interference may become too strong resulting in the distortion of the desired signal component. Once the reverberation power dominates over the power of the desired (un-reverberated) speech component the whole signal may even be suppressed. The opposite problem exists as well. That is, in systems that use postfilters, the postfilter is mainly optimized to suppress noise which may lead to insufficient suppression of the reverberation. Known spatial postfilters do not provide a mechanism to better control such artifacts.

SUMMARY OF DISCLOSURE

In one implementation, a method, in accordance with this disclosure, may include receiving, at one or more microphones, a first audio signal and a reverberation audio signal. Embodiments may further include processing at least one of the first audio signal and the reverberation audio signal. Embodiments may also include limiting a model based reverberation equalizer using a temporal constraint for direct sound distortions, the model based reverberation equalizer configured to generate one or more outputs, based upon, at least in part, at least one of the first audio signal and the reverberation audio signal.

One or more of the following features may be included. In some embodiments, the method may include receiving the one or more outputs from the model based reverberation equalizer at a postfilter. The method may further include receiving a beamformer output at a postfilter. The method may also include adjusting the model based reverberation equalizer to obtain a particular direct-to-noise ratio. The method may further include measuring the direct-to-noise ratio using, at least in part, at least one temporal criteria. The method may also include using the model based reverberation equalizer for the particular direct-to-noise ratio as a constraint equalizer configured to limit the direct sound distortion introduced by a postfilter. In some embodiments, the model based reverberation equalizer may be configured to increase a level of suppression of reverberation by a spatial postfilter. In some embodiments, the model based reverberation equalizer may be configured to limit distortion of the direct sound and enable spatial filtering at the postfilter.

In another implementation, a system for addressing acoustic signal reverberation is provided. The system may include one or more microphones having one or more processors configured to receive a first audio signal and a reverberation audio signal. The one or more processors may be further configured to process at least one of the first audio signal and the reverberation audio signal. The one or more processors may be further configured to limit a model based reverberation equalizer using a temporal constraint for direct sound distortions. In some embodiments, the model based reverberation equalizer may be configured to generate one or more outputs, based upon, at least in part, at least one of the first audio signal and the reverberation audio signal.

One or more of the following features may be included. In some embodiments, the one or more processors may be further configured to receive the one or more outputs from the model based reverberation equalizer at a postfilter. The one or more processors may be further configured to receive a beamformer output at a postfilter. The method may also include adjusting the model based reverberation equalizer to obtain a particular direct-to-noise ratio. The one or more processors may be further configured to measure the direct-to-noise ratio using, at least in part, at least one temporal criteria. The one or more processors may be further configured to use the model based reverberation equalizer for the particular direct-to-noise ratio as a constraint equalizer configured to limit the direct sound distortion introduced by a postfilter. In some embodiments, the model based reverberation equalizer may be configured to increase a level of suppression of reverberation by a spatial postfilter. In some embodiments, the model based reverberation equalizer may be configured to limit distortion of the direct sound and enable spatial filtering at the postfilter.

In another implementation, a method, in accordance with this disclosure, may include receiving, at one or more microphones, a first audio signal from a first audio signal source. The method may also include receiving, at the one or more microphones, a reverberation audio signal from a reverberation audio signal source. The method may further include processing at least one of the first audio signal and the reverberation audio signal at a beamformer. The method may also include limiting a model based reverberation equalizer using a temporal constraint for direct sound distortions, the model based reverberation equalizer configured to generate one or more outputs, based upon, at least in part, at least one of the first audio signal and the reverberation audio signal. The method may further include receiving the one or more outputs from the model based reverberation equalizer at a postfilter. The method may also include receiving a beamformer output at the postfilter.

One or more of the following features may be included. In some embodiments, the model based reverberation equalizer may include a plurality of equalizers. The plurality of equalizers include a noise equalizer, a model equalizer, and a constraint equalizer. The model based reverberation equalizer may include a coherence model.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards addressing issues of acoustic signal reverberation and the processing required to handle such acoustic signals. Accordingly, embodiments disclosed herein are directed towards protecting the direct sound component and at the same time enabling the spatial filtering property of the postfilter. In this way, the acoustic reverberation process described herein may be configured to limit the risk of direct sound distortion without losing the spatial filtering property of the postfilter. In fact, embodiments disclosed herein may even enhance the spatial filtering of the postfilter.

As used herein, the term "near-talk device" may refer to a device that is physically closer to an audio source than a "far-talk device". The near-talk and far-talk devices described herein may be any suitable electronic device such as the computing devices discussed hereinbelow. Additionally and/or alternatively, one or more of the near-talk device and the far-talk device may correspond to devices other than traditional computing devices, for example, remote control devices incorporating one or more microphones, or any device incorporating audio recording functionality, etc. As used herein, the phrase "audio source" may refer to any source of sound, for example, a user's mouth, etc.

Figure 1:
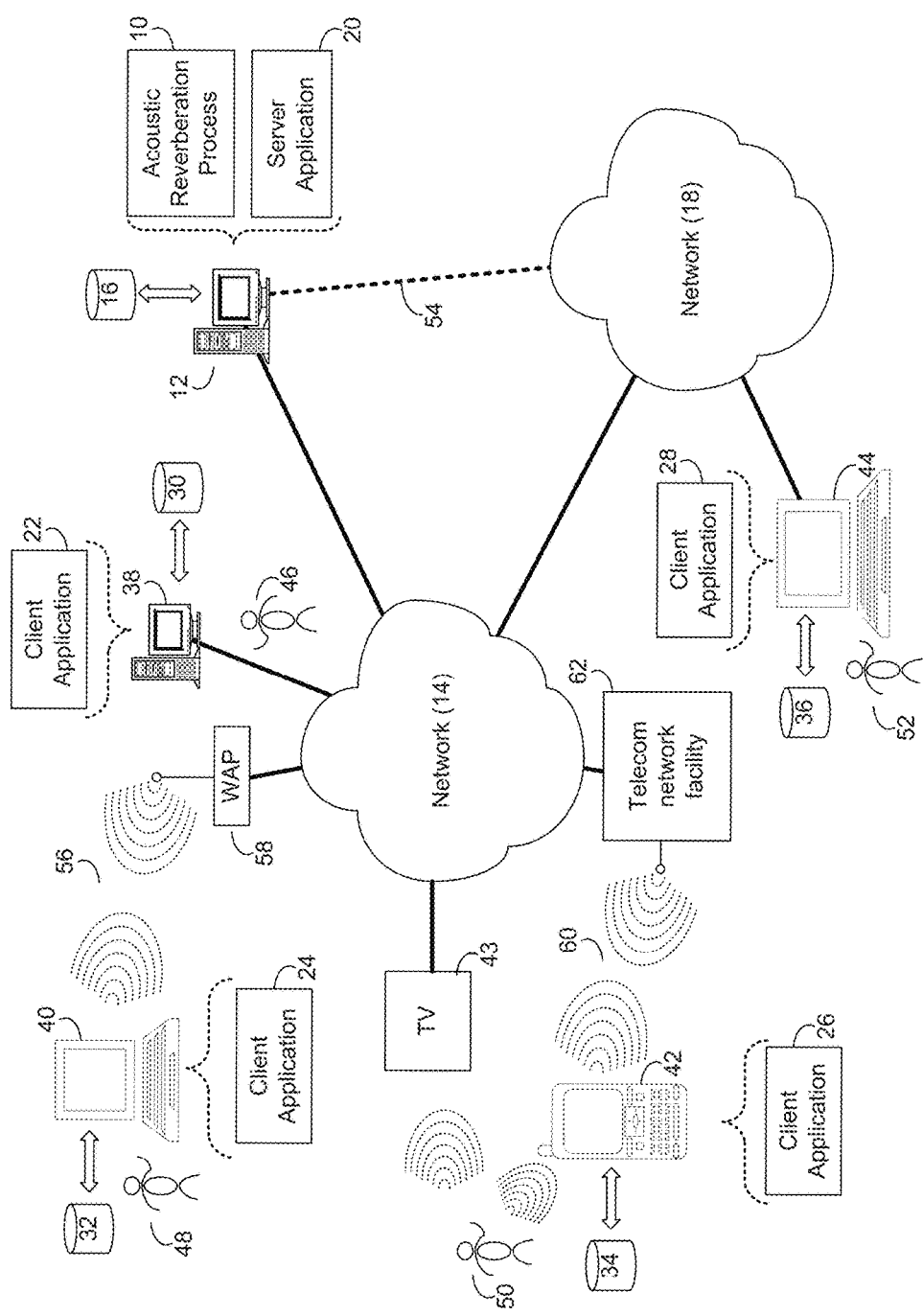
FIG. 1 is a diagrammatic view of an acoustic reverberation process in accordance with an embodiment of the present disclosure.

Referring to FIG. 1, there is shown an acoustic reverberation process 10 that may reside on and may be executed by any of the devices shown in FIG. 1, for example, computer 12, which may be connected to network 14 (e.g., the Internet or a local area network). Server application 20 may include some or all of the elements of acoustic reverberation process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-13, acoustic reverberation process 10 may include receiving (402), at one or more microphones, a first audio signal and a reverberation audio signal (404). Embodiments may further include processing (406) at least one of the first audio signal and the reverberation audio signal. Embodiments may also include limiting (408) a model based reverberation equalizer using a temporal constraint for direct sound distortions, the model based reverberation equalizer configured to generate one or more outputs, based upon, at least in part, at least one of the first audio signal and the reverberation audio signal.

The instruction sets and subroutines of acoustic reverberation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, acoustic reverberation process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of acoustic reverberation process 10. Accordingly, acoustic reverberation process 10 may be a purely server-side application, a purely client-side application, or a hybrid server-side/client-side application that is cooperatively executed by one or more of client applications 22, 24, 26, 28 and acoustic reverberation process 10.

Client electronic devices 38, 40, 42, 43, 44 may each execute an operating system, examples of which may include but are not limited to Apple iOS™, Microsoft Windows™, Android™, Redhat Linux™, or a custom operating system. Each of client electronic devices 38, 40, 42, 43, and 44 may include one or more microphones and/or speakers configured to implement acoustic reverberation process 10 as is discussed in further detail below.

Users 46, 48, 50, 52 may access computer 12 and acoustic reverberation process 10 directly through network 14 or through secondary network 18. Further, computer 12 may be connected to network 14 through secondary network 18, as illustrated with phantom link line 54. In some embodiments, users may access acoustic reverberation process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 (or television remote control, etc.) and server computing device 12. This particular type of arrangement is discussed in further detail with reference to FIGS. 2-3, which are discussed in further detail below.

Figure 2:
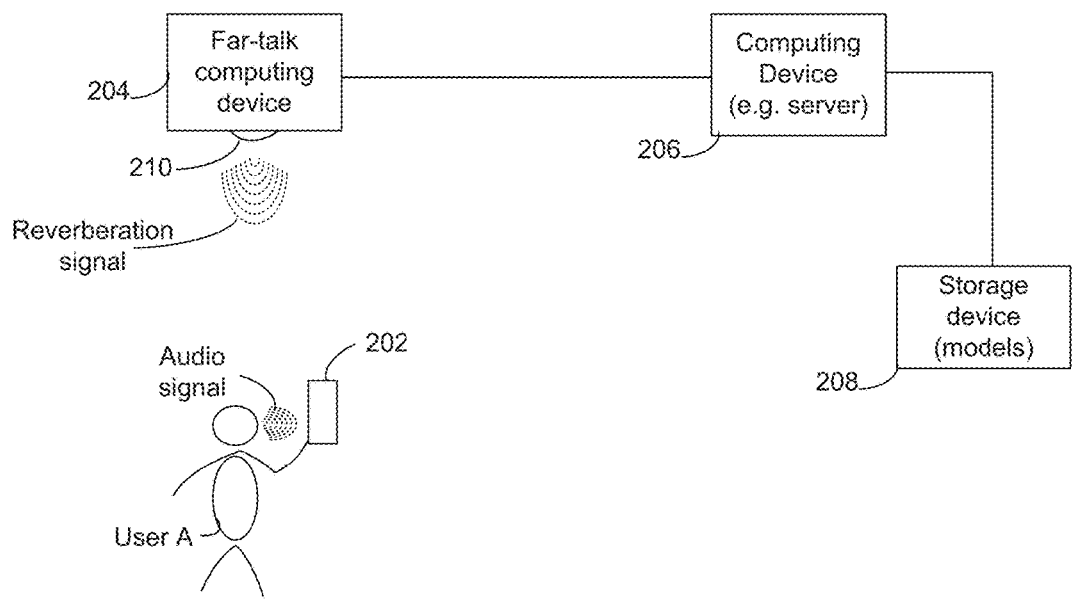
FIG. 2 is a diagrammatic view of a system configured to implement an acoustic reverberation process in accordance with an embodiment of the present disclosure.

Referring now to FIG. 2, an embodiment of acoustic reverberation process 10 shown within an example of an automatic speech recognition ("ASR") system 200 is depicted. In this particular embodiment, system 200 may include near-talk device 202, far-talk device 204, computing device 206, and one or more storage devices 208, which may be configured to store various ASR models and transforms. In some embodiments, computing device 206 and the one or more storage devices 208 may have a similar configuration to that of server computing device 12 and storage device 16 described above with reference to FIG. 1.

In the particular embodiment depicted in FIG. 2, near-talk computing device 202 may be a cellphone, television remote control, or any other suitable device having one or more microphones (e.g. User A's cellphone, etc.). Far-talk computing device 204 may correspond to a television such as television 43 shown in FIG. 1. Television 43 may include one or more audio speakers configured to produce a reverberation signal from any suitable source, e.g. an associated audio speaker (e.g. audio speaker 210), person, etc. This reverberation signal may be received (404) at one or more microphones, for example, those associated with near-talk computing device 202. At roughly the same time, User A may provide an utterance or an audio signal, which may also be received (402) at the one or microphones as well.

As shown in FIG. 2, near-talk computing device 202 may be physically closer to User A than far-talk device 204. It should be noted that although much of the discussion included herein is directed towards the example of using a television as the far-talk device, this is merely for purposes of example. Acoustic reverberation process 10 may be used in accordance with any suitable device and in any suitable venue. For example, the teachings of the present disclosure may be configured to operate in a vehicle such as an automobile or in any other situation that may include both a near-talk and far-talk device as defined above.

As discussed herein, in some embodiments, acoustic reverberation process 10 may be used in conjunction with a television such as television 43 shown in FIG. 1. In this type of application there may be some number of audio channels (e.g., two, five or even seven audio channels) played back simultaneously (e.g., in a stereo or surround sound environment).

Figure 3:
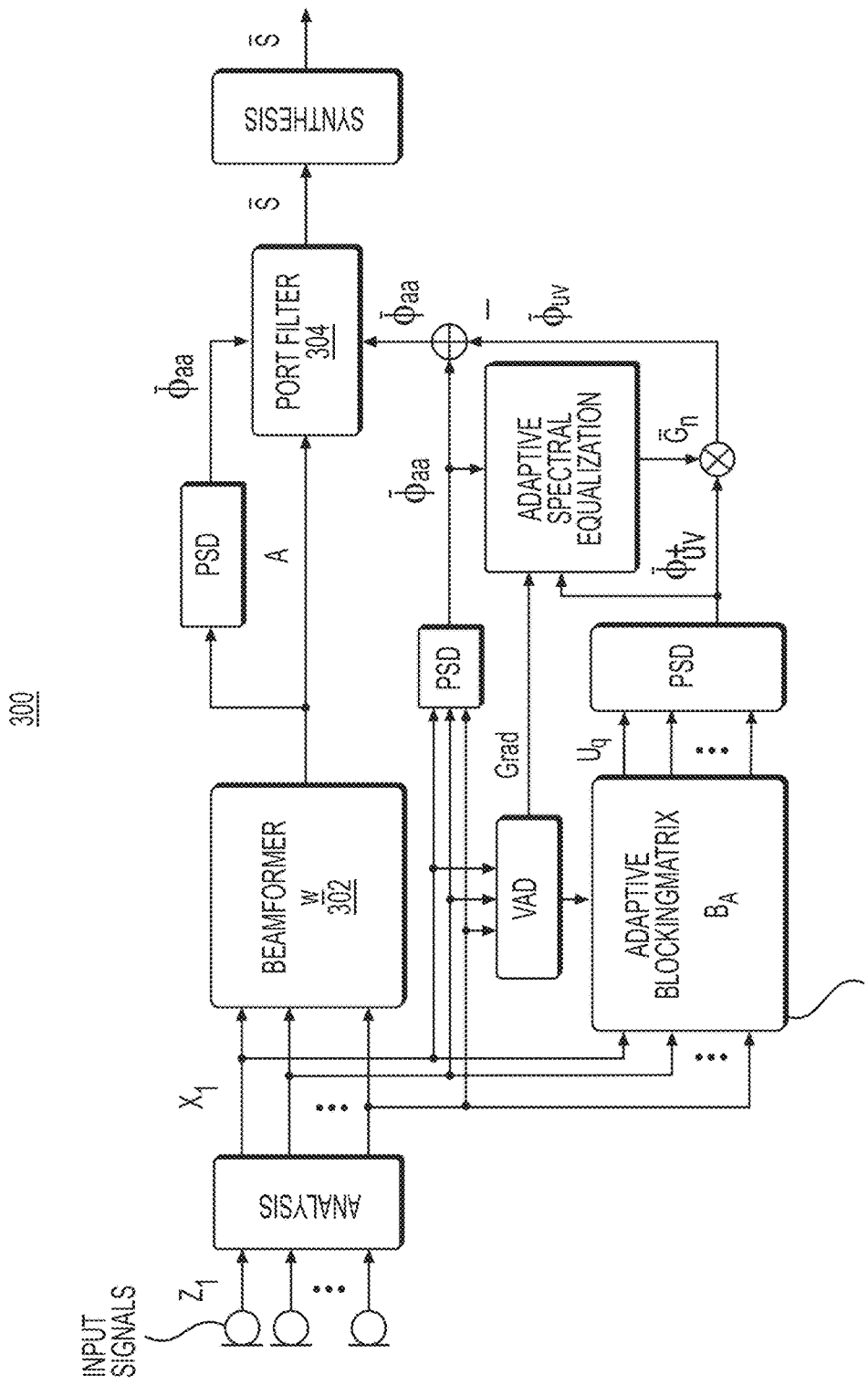
FIG. 3 is a diagrammatic view of a system configured to implement an acoustic reverberation process in accordance with an embodiment of the present disclosure.
Figure 4:
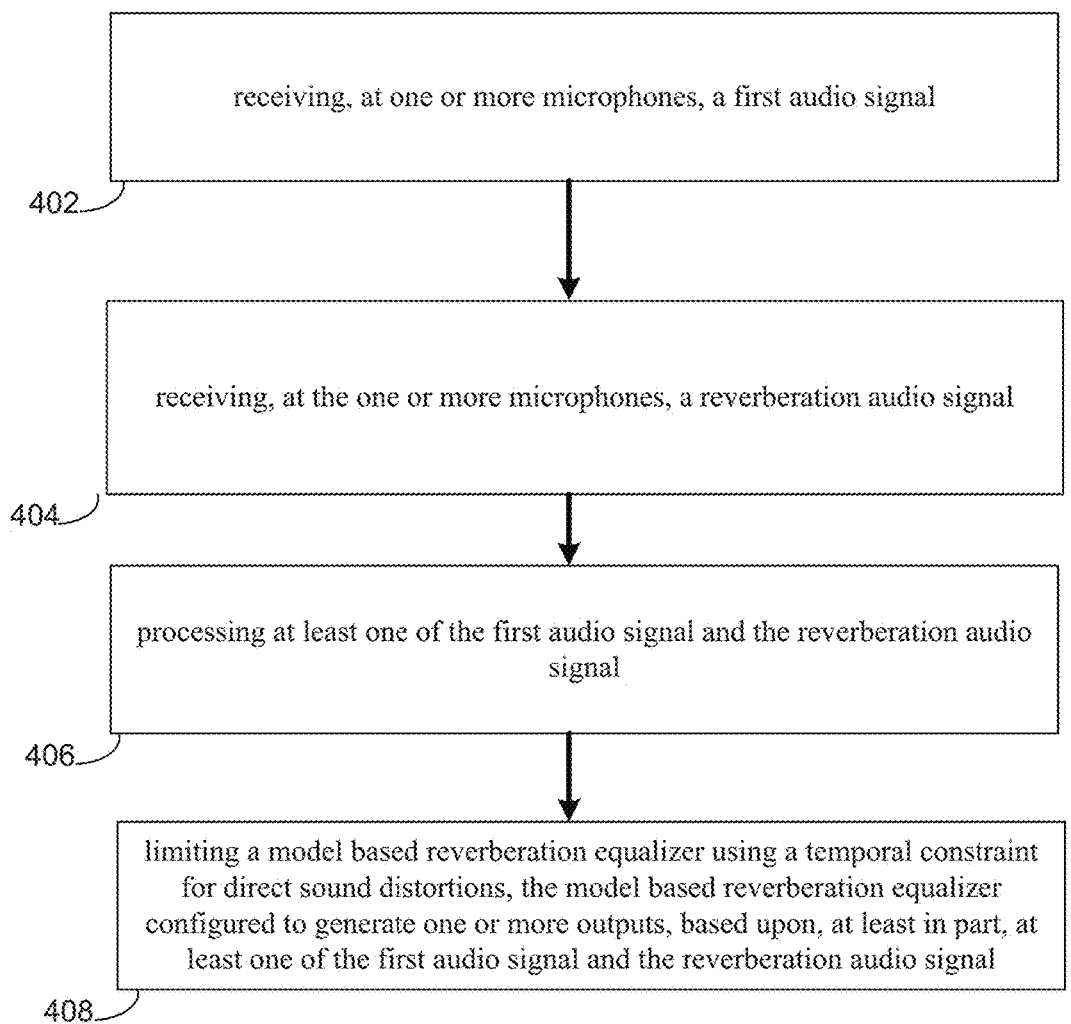
FIG. 4 is a flowchart of an acoustic reverberation process in accordance with an embodiment of the present disclosure.

Referring now to FIG. 3, an embodiment of a system 300 including both a beamformer and a postfilter is provided. System 300 may be associated with one or microphones such as those described above. In some embodiments, system 300 may be configured to receive one or more audio signals such as the reverberation signal and audio signals described above. System 300 may include beamformer 302 and postfilter 304 as well as a number of other processing components and circuitry types, such as those discussed below. In some embodiments, acoustic reverberation process 10 may be configured to process (406) at least one of the first audio signal and the reverberation audio signal. For example, processing of audio signals may occur in beamformer 302, postfilter 304, adaptive blocking matrix 306, etc.

Beamforming, as used herein, may generally refer to a signal processing technique used in sensor arrays for directional signal transmission or reception. Beamforming methods may be used for background noise reduction, particularly in the field of vehicular handsfree systems, but also in other applications. A beamformer such as beamformer 302, may be configured to process signals emanating from a microphone array to obtain a combined signal in such a way that signal components coming from a direction different from a predetermined wanted signal direction are suppressed. Microphone arrays, unlike conventional directional microphones, may be electronically steerable which gives them the ability to acquire a high-quality signal or signals from a desired direction or directions while attenuating off-axis noise or interference. It should be noted that the discussion of beamforming is provided merely by way of example as the teachings of the present disclosure may be used with any suitable signal processing method.

Beamforming, therefore, may provide a specific directivity pattern for a microphone array. In the case of, for example, delay-and-sum beamforming (DSBF), beamforming encompasses delay compensation and summing of the signals. Due to spatial filtering obtained by a microphone array with a corresponding beamformer, it is often possible to improve the signal to noise ratio ("SNR"). However, achieving a significant improvement in SNR with simple DSBF requires an impractical number of microphones, even under idealized noise conditions. Another beamformer type is the adaptive beamformer. Traditional adaptive beamformers optimize a set of channel filters under some set of constraints. These techniques do well in narrowband, far-field applications and where the signal of interest generally has stationary statistics. However, traditional adaptive beamformers are not necessarily as well suited for use in speech applications where, for example, the signal of interest has a wide bandwidth, the signal of interest is non-stationary, interfering signals also have a wide bandwidth, interfering signals may be spatially distributed, or interfering signals are non-stationary. A particular adaptive array is the generalized sidelobe canceller (GSC). The GSC uses an adaptive array structure to measure a noise-only signal which is then canceled from the beamformer output. However, obtaining a noise measurement that is free from signal leakage, especially in reverberant environments, is generally where the difficulty lies in implementing a robust and effective GSC. An example of a beamformer with a GSC structure is described in L. J. Griffiths & C. W. Jim, An Alternative Approach to Linearly Constrained Adaptive Beamforming, in IEEE Transactions on Antennas and Propagation, 1982 pp. 27-34.

In T. Wolff and M. Buck, "A Generalized View on Microphone Array Postfilters", *Proc. International Workshop on Acoustic Echo and Noise Control (IWAENC)*, Tel Aviv, Israel, 2010, a postfilter transfer function is described that generalizes some known post-filters such as those proposed by Zelinski, Simmer, McCowan, Leukimmiatis etc. A generalized postfilter is provided below:

$$H_{pf} = \max\left[\frac{\Phi_{xx}}{\Phi_{aa}}\left(1 - \frac{tr\{BJ_{xx}B^H\}}{tr\{BJ_{nn}B^H\}}\right)\frac{G_{bm}}{G_{bm}-1}, 0\right] \quad \text{Equation 1}$$

Here, $\Phi_{xx}$ denotes the power spectral density (PSD) at the microphones and $\Phi_{aa}$ is the PSD at the beamformer output. The term in the middle determines the spatial characteristic of the filter as it depends on the coherence matrix of the entire sound field $J_{xx}$ as well as the one of the noise $J_{nn}$. The matrix B can be designed to match the postfilter to any given beamformer: If B is orthogonal to the LCMV constraint matrix $C_{bf}$ hence $BC_{bf}=0$, then B becomes a blocking matrix and the postfilter implements the same constraints as the beamformer. The third part of the transfer function denotes the influence of the blocking matrix gain $G_{bm}$. For further details please see T. Wolff and M. Buck, "A Generalized View on Microphone Array Postfilters", *Proc. International Workshop on Acoustic Echo and Noise Control (IWAENC)*, Tel Aviv, Israel, 2010.

In some embodiments, beamformer-postfilter system 300 may consist of an arbitrary beamformer 302, a blocking matrix 306 and an adaptive postfilter 304. Postfilter 304 may be ideally matched to beamformer 302 if the blocking matrix constraint is identical to the beamformer constraint: $C_{pf}=C_{bf}$. If this holds, the blocking matrix may reject all those signal components that are kept undistorted by the beamformer.

Equation 1 states that the sum of all PSDs at the blocking matrix output $\Phi_{uu}^+ = tr\{B\Phi_{xx}B^H\}$ may be computed first. For an ideal blocking matrix, this PSD may not contain any desired speech components anymore, because they have been rejected by the blocking matrix (blocked). Practically, however, the reverberation does pass the blocking matrix, because it does not impinge from the steering direction of the beamformer (diffuse sound). Therefore we observe noise as well as reverberation at the blocking matrix output. According to Equation 1 this PSD ($\Phi_{uu}^+$) has to be equalized by $$G_n = tr\{BL_{nn}B^H\}^{-1} = \Phi_{nn}/\Phi_{uu}^+ \quad \text{Equation 2}$$

to make up for the coloration introduced through the blocking matrix B. Here, $\Phi_{nn}$ is the noise-PSD at the microphones. The resulting noise estimate may then be subtracted from the input PSD $\Phi_{xx}$ to obtain the PSD of the desired speech $\Phi_{ss}=\Phi_{xx}-\Phi_{nn}$. Together with the PSD at the beamformer output $\Phi_{aa}$, the optimal postfilter $H_{pf}$ can be computed.

The equalizer $G_n$, however, is not known in general and must therefore be estimated. Classical postfilters such as the one proposed by Zelinski or McCowans Postfilter, do so by using a Model $\hat{J}_{nn}$ for the noise coherence function. For example, an uncorrelated noise field or a diffuse noise field is assumed. These models result in a certain equalizer for the noise $G_n$. Practically, both assumptions do generally not coincide with real noise fields, so the noise estimators will be biased. As a consequence, the respective filters are not optimal under practical conditions, which means that either the noise is not suppressed or the filter will be too aggressive and suppresses speech. Therefore, it has been proposed in T. Wolff and M. Buck, "A Generalized View on Microphone Array Postfilters", *Proc. International Workshop on Acoustic Echo and Noise Control (IWAENC)*, Tel Aviv, Israel, 2010, to estimate the equalization filter $G_n$ adaptively. This is typically achieved by temporal averaging of $\Phi_{nn}/\Phi_{uu}^+$ during speech pauses and provides an unbiased estimate for the noise PSD which improves the performance with respect to the noise. To find the speech pauses it is necessary to use voice activity detection (VAD), which can be implemented similar to the spatial VAD proposed in O. Hoshuyama and A. Sugiyama, "Robust Adaptive Beamforming", *Microphone Arrays*, Springer, Berlin, Heidelberg, N.Y. (2001).

A similar reasoning holds for the speech, i.e., if the complex coherence function of the de-sired speech component is not considered correctly, the postfilter leads to undesired speech distortion. One way to minimize them is to use an adaptive implementation of the blocking matrix as proposed in O. Hoshuyama and A. Sugiyama, "Robust Adaptive Beamforming", *Microphone Arrays*, Springer, Berlin, Heidelberg, N.Y. (2001), for instance. The blocking matrix gain $G_{bm}$ in Equation 1 is then typically considered to be infinite, so there is no need to estimate it (see also T. Wolff and M. Buck, "Influence of Blocking Matrix Design on Microphone Array Postfilters", *Proc. International Workshop on Acoustic Echo and Noise Control (IWAENC)*, Tel Aviv, Israel, 2010. As a consequence, the residual speech that practically still passes the blocking matrix is treated as interference which results in a dereverberating effect.

Even with an adaptive blocking matrix it is desired to better control the dereverberation effect of the postfilter. The filter as described so far does not offer any possibility to control the dereverberation explicitly. The reason for this is that the equalizer $G_n$ is designed to match the noise field—not the reverberation. With regard to the reverberation, things just happen without any control.

The problem of protecting the direct sound from undesired distortions is discussed somewhat in E. A. P. Habets and S. Gannot, "Dual-microphone Speech Dereverberation Using a Reference Signal," *International Conference on Acoustics, Speech and Signal Processing (ICASSP '07)*, Honolulu, Hi., 2007. The main idea proposed there is to delay the PSD at the blocking matrix output $\Phi_{uu}$ by a few frames D $$\Phi_{uu}(k,\mu) \rightarrow \Phi_{uu}(k-D,\mu) \quad \text{Equation 3}$$

and match it to the noise PSD at the beamformer output (note this is in the current frame). The "matching" may be performed using a gradient algorithm to find the respective mapping. Since the "noise reference spectrum" $\Phi_{uu}$ is delayed (hence does not yet contain the reverb in the current frame) the resulting postfilter exhibits enhanced robustness with respect to distortion of the direct sound. The delaying, however, turns the simple relation between $\Phi_{uuu}(k, \mu)$ and the noise PSD at the beamformer output (just a time-invariant equalizer) into a rather complex relation that depends on signal properties. Also, the proposed method neither offers a way to achieve stronger suppression of the reverberation, not offers it a way to control the direct sound distortions explicitly.

Embodiments of acoustic reverberation process 10 may be configured to implement a beamformer with a spatial postfilter. Both, the beamformer as well as the spatial postfilter may be configured to suppress the reverberation as these algorithms focus on the desired speaker spatially. The reverberation typically hits the microphones from other directions (diffuse soundfield). Putting a spatial focus in the direction of the speaker therefore suppresses the reverb. Hence, the reverberation may act as an interfering signal.

Figure 5:
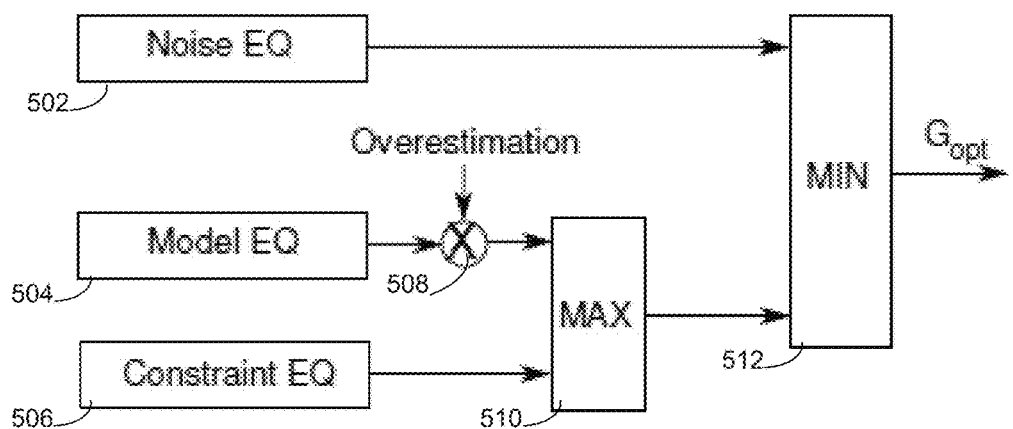
FIG. 5 is a diagrammatic view of a system configured to implement an acoustic reverberation process in accordance with an embodiment of the present disclosure.
Figure 6:
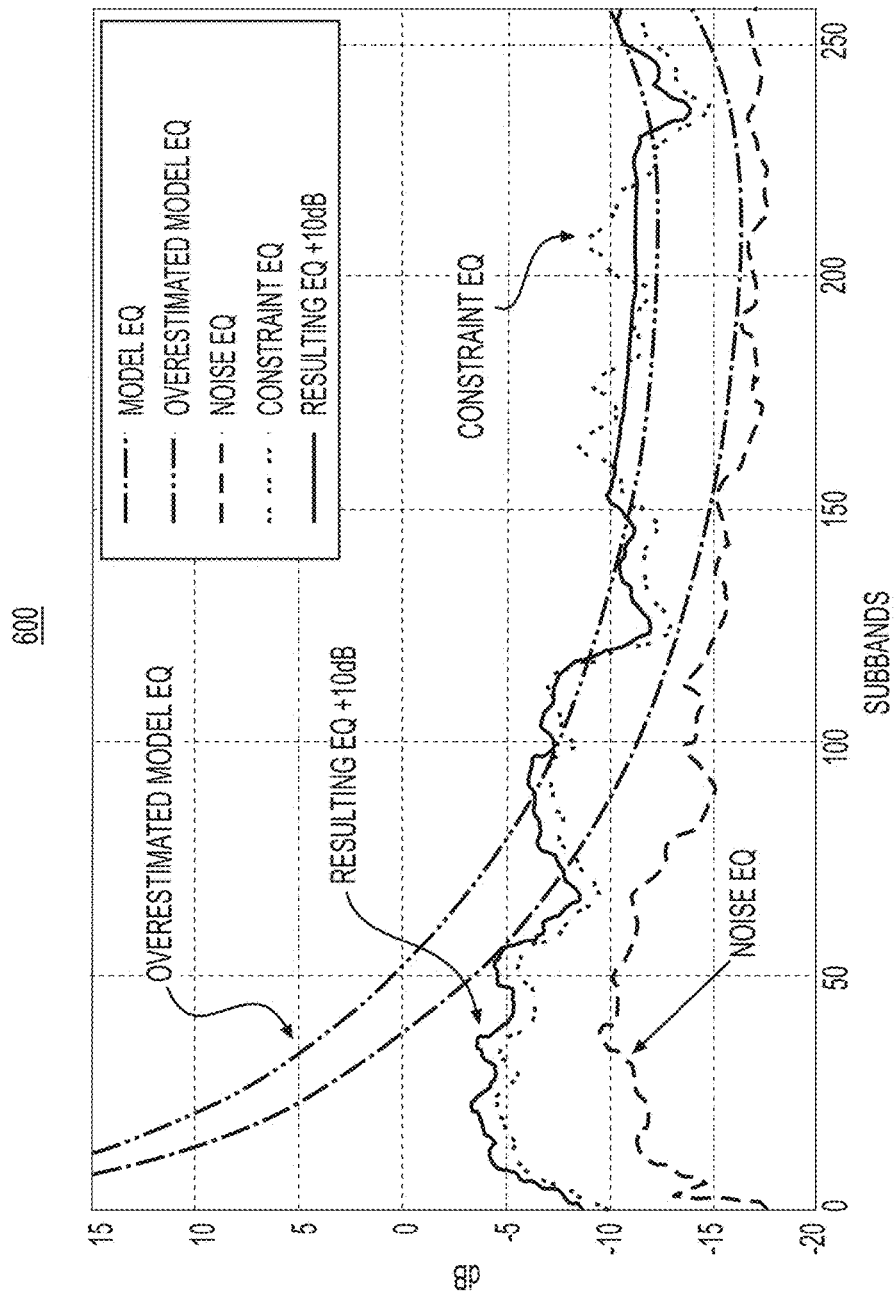
FIGS. 6-10 depict graphical representations associated with the acoustic reverberation process in accordance with an embodiment of the present disclosure.

Referring now to FIG. 5, an embodiment of a model based equalization system 500, which may be used with acoustic reverberation process 10 is provided. As discussed above, acoustic reverberation process 10 may include limiting (408) a model based reverberation equalizer using a temporal constraint for direct sound distortions. The model based reverberation equalizer may be configured to generate one or more outputs, based upon, at least in part, at least one of the first audio signal and the reverberation audio signal. In this way, in order to optimize the postfilter's behavior with respect to reverberation, acoustic reverberation process 10 may incorporate an equalization filter $G_{opt}(k, \mu)$ instead of $G_n(k, \mu)$. Accordingly, acoustic reverberation process 10 may utilize a model based equalization that results from the coherence function of diffuse sound, overestimate it and impose an upper limit (e.g. Constraint-EQ 506) that limits the distortion of the direct sound components. The latter is achieved by ensuring a minimum required direct-to-noise ratio (DNR) as is shown in FIG. 5.

In some embodiments, the model based reverberation equalizer may be configured to increase a level of suppression of reverberation by a spatial postfilter (e.g. postfilter 304). The model based reverberation equalizer may also be configured to limit some or all of the distortion of the direct sound and enable spatial filtering at the postfilter.

In some embodiments, acoustic reverberation process 10 may include receiving one or more outputs from the model based reverberation equalizer at a postfilter such as postfilter 304 shown in FIG. 3. Postfilter 304 may also receive a beamformer output, for example, from beamformer 302.

If the equalizer is designed for the diffuse noise field, the resulting postfilter may be too aggressive in the lower frequencies because the coherence functions of the direct sound and the diffuse sound may not differ greatly. Therefore, both may be suppressed. Applying the diffuse soundfield model may not produce an optimal solution in the lower frequencies.

In the higher frequencies, the diffuse soundfield model differs greatly from the coherent direct soundfield and therefore the spatial postfilter works well and leads to the suppression of reverberation. From the viewpoint of de-reverberation, the performance could practically be enhanced though (a higher suppression of reverb may be desired.). A higher suppression of the reverberation could simply be achieved by overestimating the noise PSD. This, however, may lead to undesired distortions of the desired signal components (direct sound). To what degree those will be distorted depends on the DNR.

To achieve an optimized equalization that yields a better suppression of the reverb with acceptable distortion of the direct sound, embodiments of acoustic reverberation process 10 may use the coherence model for the diffuse sound field and apply an overestimation to it. In this way, acoustic reverberation process 10 may provide an improved reverberation suppression in the higher frequencies. At the same time, the direct sound distortions may also be increased. To limit these distortions, acoustic reverberation process 10 may utilize one or more constraints. A constraint equalizer $G_c(k, \mu)$ may be used as the upper limit of the final equalizer:

$$G_{opt}(k,\mu)=\max[\min[G_{dif}(k,\mu),G_c(k,\mu)],G_n(k,\mu)] \quad \text{Equation 4}$$

A constraint equalizer is determined to yield a predetermined amount of acceptable direct sound distortion. As a lower bound for the resulting equalizer, acoustic reverberation process 10 may utilize the regular noise equalizer $G_n(k, \mu)$, as the postfilter may no longer suppress the noise if anything below this level was selected. Therefore, the resulting postfilter may retain its regular properties of a noise suppression filter, like the dependency on the SNR for example, but may improve the suppression of the reverberation as long as the noise PSD does not dominate. An example depicting equalizers obtained with real signals is provided in FIG. 6.

In some embodiments, in order to implement the constraint to the equalizer, the direct sound components in the reverberant signal must be identified. Accordingly, acoustic reverberation process 10 may be configured to exploit their temporal properties. As the direct sound appears earlier than the reverb at the microphone (i.e., shortest path from the source to the microphone), the first part of the signal after an onset may be considered primarily as direct sound. Therefore, acoustic reverberation process 10 may be configured to remove the onsets from the signal so the noise and the reverb tails may be left. The result of removing the direct sound component $\psi(k, \mu)$ may then be used to measure the DNR:

$$DNR(k, \mu) = \mathcal{F}S\left[\max\left(\frac{\Phi_{xx}(k, \mu)}{\psi(k, \mu)} - 1, 0\right)\right] \quad \text{Equation 5}$$

In some embodiments, the operator $\mathcal{F}S(\bullet)$ may account for optional smoothing along frequency. The important part of this measure is the way $\psi(k, \mu)$ is determined. As discussed below, different ways of computing $\psi(k, \mu)$ are possible without departing from the scope of the present disclosure.

For example, one method to remove the direct sound from the input PSD is to evaluate the minimum of the current PSD and its time-shifted version:

$$\psi_{min-shift}(k,\mu)=\min[\Phi_{xx}(k,\mu),\Phi_{xx}(k-D,\mu)] \quad \text{Equation 6}$$

The DNR for this case then reads:

$$DNR_{min-shift}(k, \mu) = \\ \mathcal{F}S\left[\max\left(\frac{\Phi_{xx}(k, \mu)}{\min[\Phi_{xx}(k, \mu), \Phi_{xx}(k - D, \mu)]} - 1, 0\right)\right] \quad \text{Equation 7}$$

Figure 7:
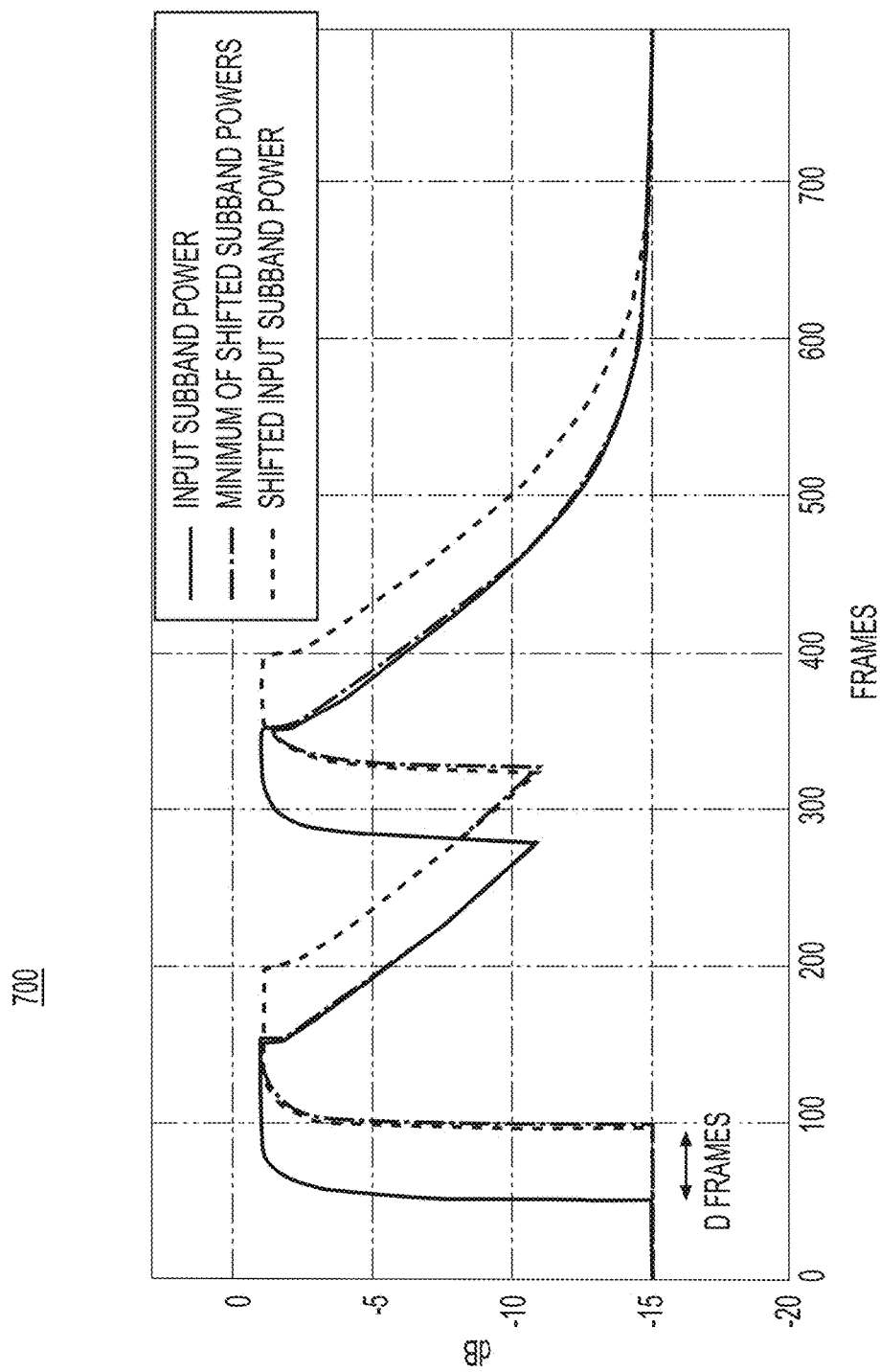

This particular approach may require memory for D frames of PSD-buffering and detects all onsets that are shorter than D frames. Any signal component that has not decayed after D frames may be considered as non-direct sound. FIG. 7 shows an example.

Another method of removing the direct sound may include the maximum of the current and the delayed input PSD:

$$\Phi_{max}(k,\mu) = \max[\Phi_{xx}(k,\mu), \Phi_{xx}(k-D,\mu)] \quad \text{Equation 8}$$

Then, $\Phi_{max}(k, \mu)$ may be used whenever the current $\Phi_{xx}(k, \mu)$ is below it:

$$\psi_{max\text{-}shift}(k, \mu) = \begin{cases} \Phi_{max}(k, \mu), & \Phi_{xx}(k, \mu) < \Phi_{max}(k, \mu) \\ \Phi_{xx}(k, \mu), & \text{else} \end{cases} \quad \text{Equation 9}$$

Figure 8:
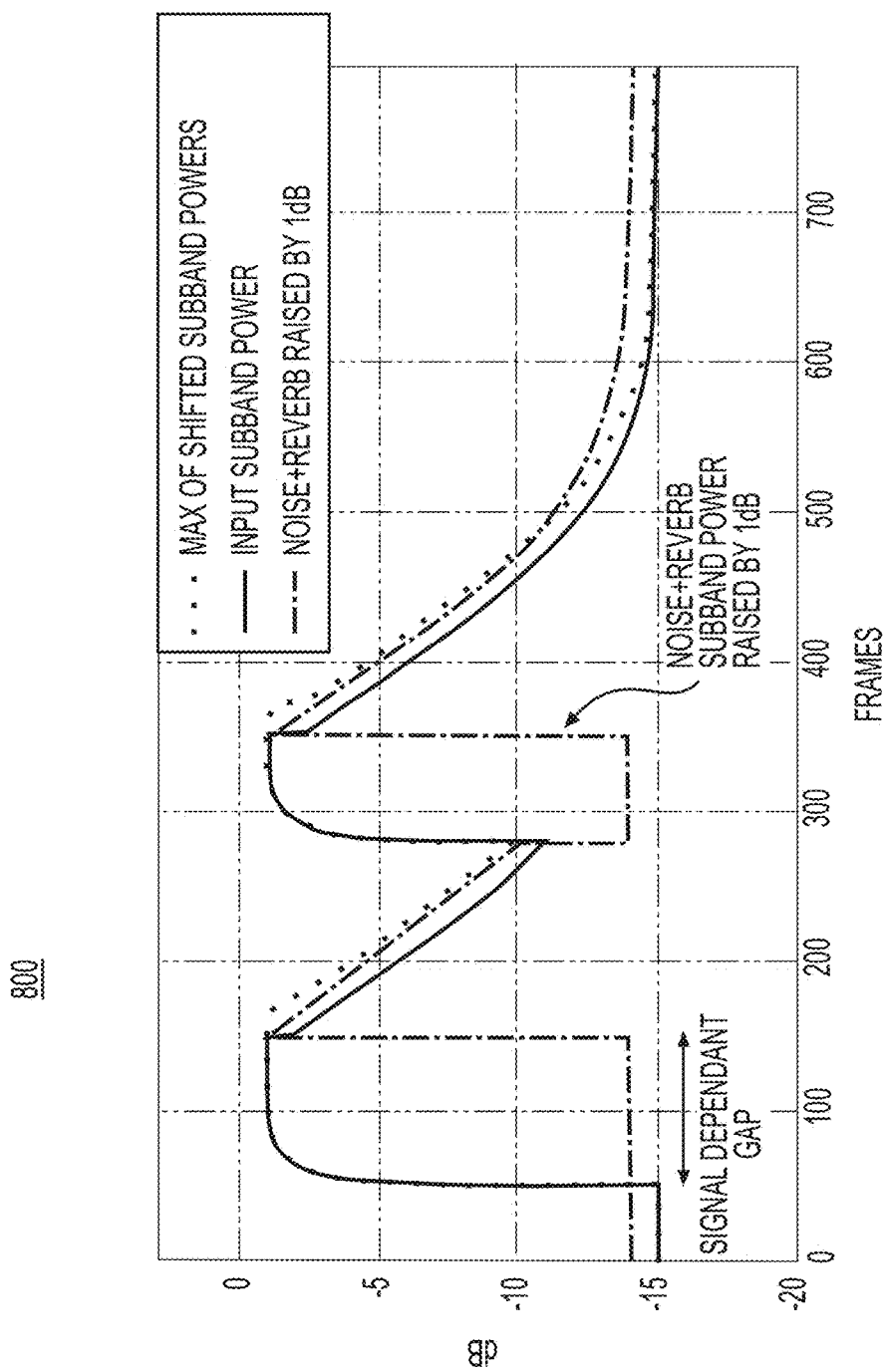

During onsets, or direct sound passages, $\psi_{max\text{-}shift}(k, \mu)$ remains at the noise level. Once the input PSD drops, the current PSD may be used. Thus, the mechanism blocks the direct sound components. In contrast to some approaches, the gap-length where the direct sound will be blocked may depend on the signal and is not fixed to D frames. This spectrum with removed direct sound $\psi_{max\text{-}shift}(k, \mu)$ may then be used in Equation 5 to compute the DNR. FIG. 8 gives an example of this approach.

In some embodiments, both of the mechanisms described above may be combined. For example, if desired, the min-shifting in Equation 6 may be applied to $\psi_{max\text{-}shift}(k, \mu)$ to further remove reverberation energy.

For rejecting the direct sound components from the input PSD, one of the above mentioned mechanisms can be extended by a recursion. To this end the following coefficients are computed:

$$H_d(k, \mu) = \max\left[1 - \left(\frac{\psi_{rec}(k-1, \mu)}{\Phi_{xx}(k, \mu)}\right), H_{min}\right] \quad \text{Equation 10}$$

whereas $\psi_{rec}(k, \mu)$ is the PSD with blocked direct sound components from the last frame.

The term $H_{min}$ denotes the minimum value for the filter coefficients or the maximum attenuation applied (usually the filter attenuation is limited to intentionally leave a residual noise floor). The corresponding coefficients from the last frame $H_d(k=1, \mu)$ may be employed to dynamically fade between the estimate for the stationary noise PSD and the current input PSD:

$$\psi_{rec}(k,\mu) = a(k,\mu) \cdot \psi(k,\mu) + (1 - a(k,\mu)) \cdot \Phi_{stat}(k,\mu) \quad \text{Equation 11}$$

whereas $\psi(k, \mu)$ may be $\psi_{max\text{-}shift}$ for instance. Here, $\alpha(k, \mu)$ depends on the last coefficients $H_d(k-1, \mu)$ according to the following rule:

$$\alpha(k, \mu) = \max\left[\min\left[\frac{H_0 - H_d(k-1, \mu)}{H_0 - H_{min}}, 1\right], \alpha_{min}\right] \quad \text{Equation 12}$$

Figure 9:
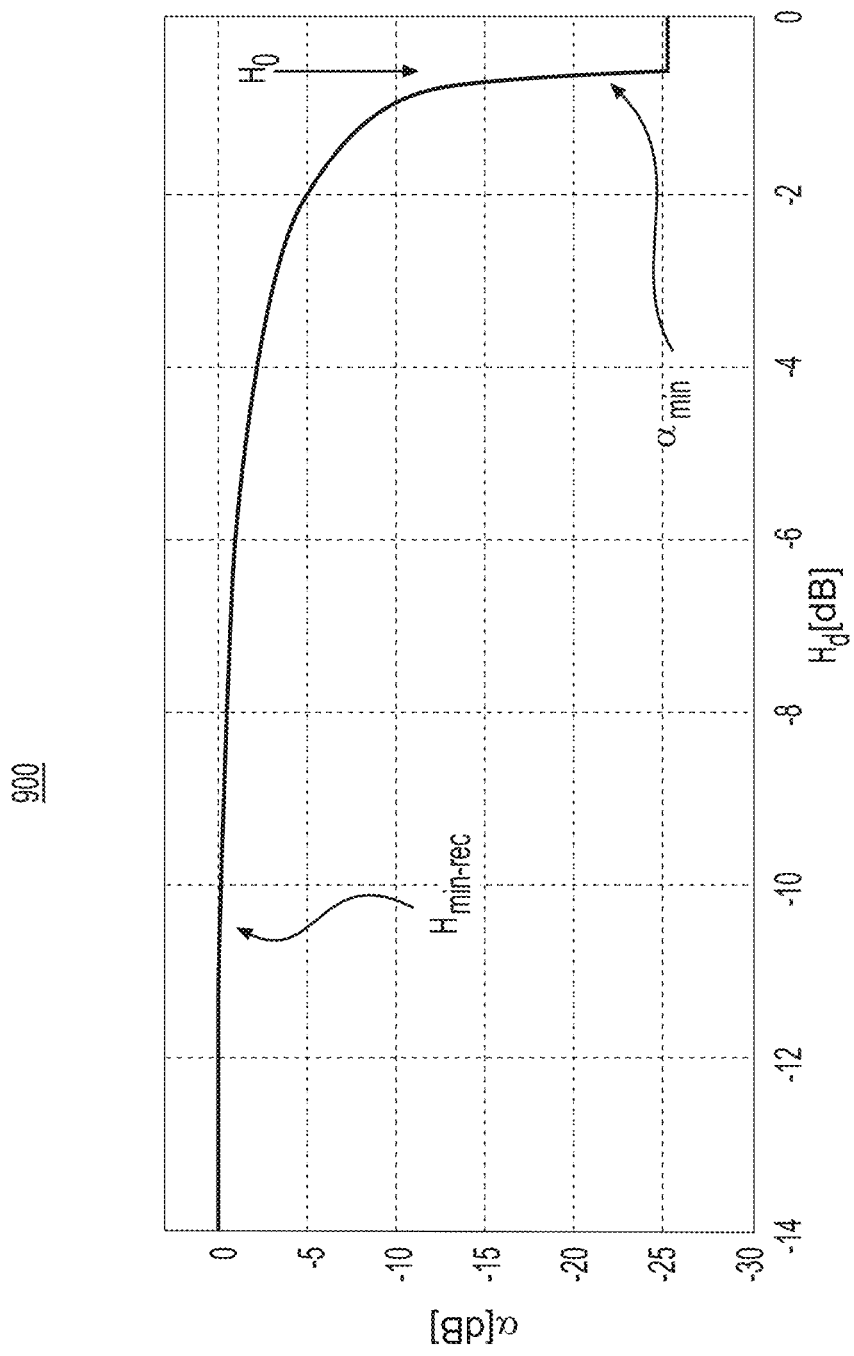
Figure 10:
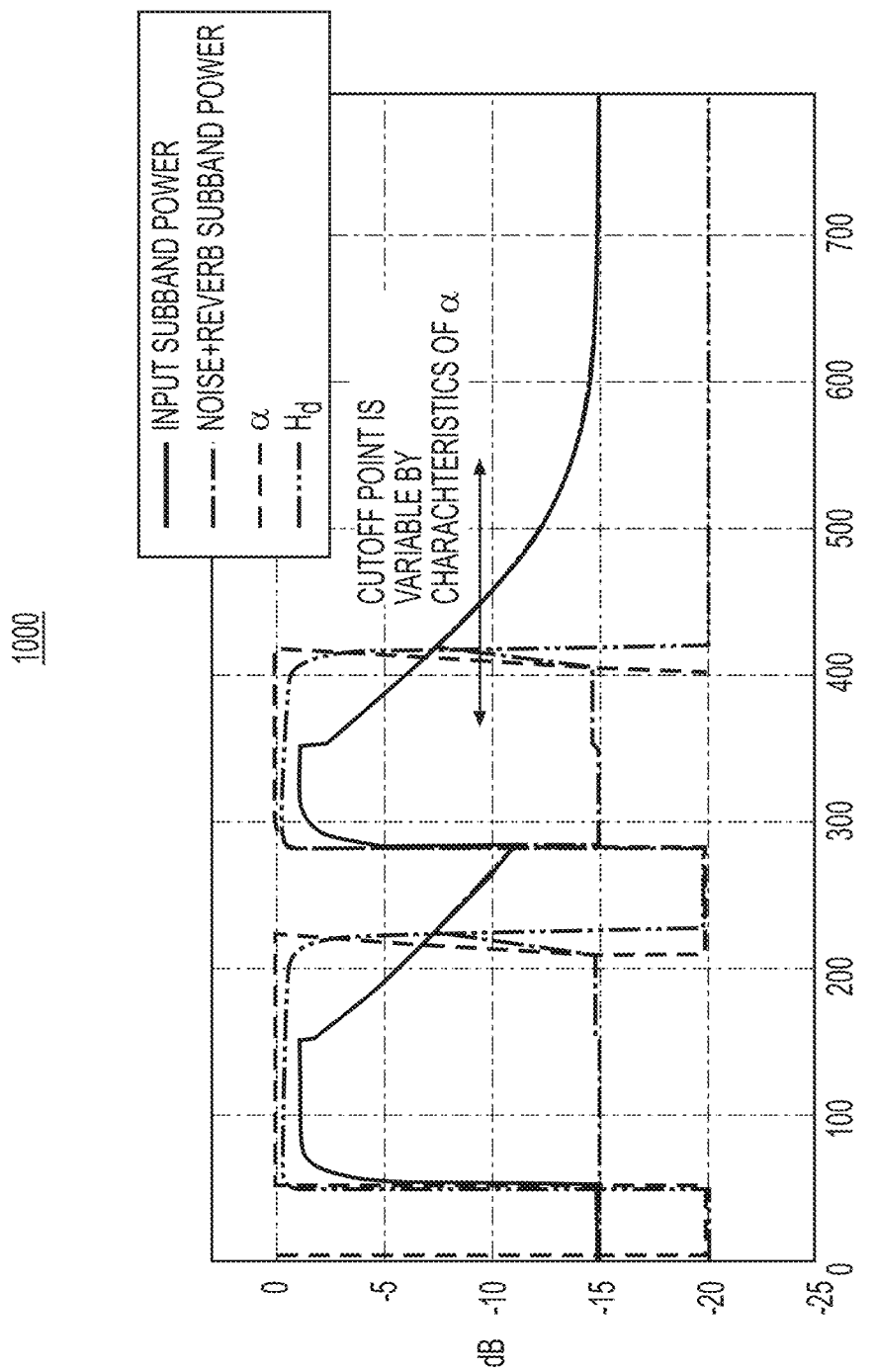

FIG. 9 shows how $\alpha$ depends on the past filter coefficient. To understand this mechanism, imagine that the basic direct sound blocking mechanism, such as $\psi_{max\text{-}shift}$, lets the filter $H_d(k, \mu)$ open at the signal onset. The filter is then open and leads to an underestimation of $\psi_{max\text{-}shift}$—as $\psi_{rec}(k, \mu)$ fades to $\Phi_{stat}(k, \mu)$ then. As a consequence the filter $H_d$ may permit the direct sound pass even more, as if $\psi_{rec}(k, \mu)$ was used alone. Once it starts to close, because the signal decays, $\psi_{rec}(k, \mu)$ returns to $\psi_{max\text{-}shift}$ and $H_d$ closes even faster. An example is given in FIG. 10.

The way this recursion starts to take effect, depends on the characteristic of $\alpha(k, \mu)$. The parameter Ho is important to control how quickly the filter $H_d$ closes. Thereby it can be controlled how aggressively the direct sound components are filtered out. The parameter $\alpha_{min}$ controls to what extend the PSD of the stationary noise is employed.

The equalizer $G_c(k, \mu)$ is adjusted such that a given minimum direct-to-noise Ratio ("$DNR_{min}$") is obtained in average. The error-function is the mean squared error $$E\{(e(k,\mu))^2\} \to \min \quad \text{Equation 13}$$

Here, $E\{\bullet\}$ denotes the expectation operator. The error in this case is:

$$e(k, \mu) = \frac{DNR_{MIN} \cdot \Phi_{uu}(k, \mu)}{\psi_{xx}(k, \mu)} \cdot G_c(k, \mu) - \mathcal{F}\{DNR(k, \mu)\} \quad \text{Equation 14}$$

Figure 11:
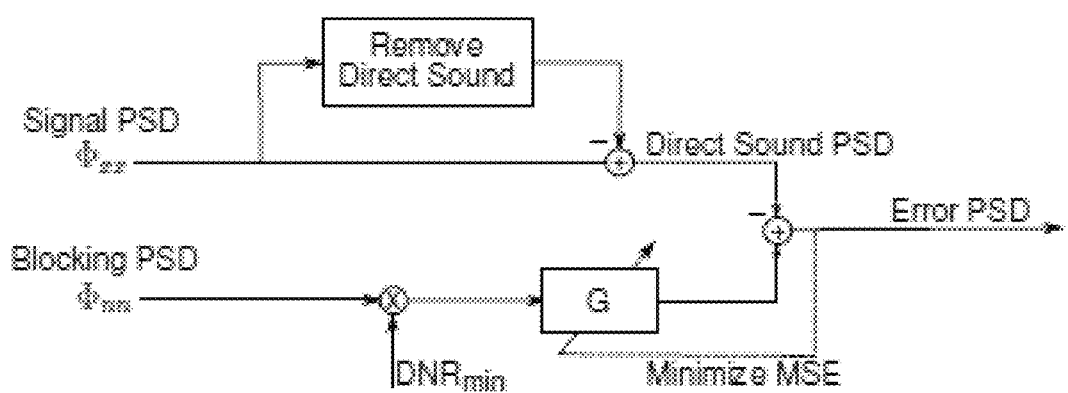
FIG. 11 is a diagrammatic view of a system configured to implement an acoustic reverberation process in accordance with an embodiment of the present disclosure.

The operator $\mathcal{F}\{\bullet\}$ stands for some additional frequency-weighting. Minimizing the error square above is equivalent to adjusting the equalizer such that $$E\left\{\frac{\max[\Phi_{xx}(k, \mu) - \psi_{xx}(k, \mu), 0]}{\Phi_{uu}(k, \mu) \cdot G_c(k, \mu)}\right\} = DNR_{MIN} \quad \text{Equation 15}$$

is satisfied in average. For the minimization itself different algorithms exist. A very simple but robust way to adjust $G_c(k, \mu)$ is the sign algorithm, where $G_c(k, \mu)$ is increased if the error is negative and vice versa. More sophisticated algorithms that additionally take the error magnitude into account (rather than just its sign) may also be applied. In FIG. 11 this way of finding the constraint equalizer is depicted.

The adaptation of the constraint equalizer may be carried out if a desired speech signal is present. This can be controlled in a broadband way using a spatial voice activity detector as described in O. Hoshuyama and A. Sugiyama, "Robust Adaptive Beamforming", *Microphone Arrays*, Springer, Berlin, Heidelberg, N.Y. (2001). In some instances, acoustic reverberation process 10 may be configured to implement this control mechanism in a frequency selective way. To do so, the adaptation should only be carried out if $$\Phi_{aa}(k,\mu) > T \cdot \Phi_{nn} \quad \text{Equation 16}$$

whereas T denotes a threshold. Thereby the adaptation focuses on direct sound components from the steering direction.

It should be noted that in Equation 14 acoustic reverberation process 10 may be configured to use a purely temporal mechanism to measure the DNR. Still the postfilter remains a spatial filter because the temporal measure is used simply to adjust the equalizer (i.e., the filtering itself will not loose its spatial property). This is true, even if the adaptation is performed without the spatial criterion described above. In some embodiments, acoustic reverberation process 10 may be configured to adapt to direct sound from the steering direction of the beamformer postfilter system.

As discussed above, acoustic reverberation process 10 may be configured to adjust the model based reverberation equalizer to obtain a particular direct-to-noise ratio. Acoustic reverberation process 10 may also be configured to measure the direct-to-noise ratio using at least one temporal criteria. In some embodiments, acoustic reverberation process 10 may be configured to use the model based reverberation equalizer for the particular direct-to-noise ratio as a constraint equalizer configured to limit the direct sound distortion introduced by a postfilter (e.g. postfilter 304).

In some embodiments, one approach for estimating the postfilter transfer function as described above is based on finding the equalizer that maps the blocking matrix output spectrum $\Phi_{uu}$ to the noise (respectively the reverb) at the microphones. This, however, is not the only one way of implementing the postfilter estimation. Another way is to map $\Phi_{uu}$ to the noise at the beamformer output.

The resulting noise PSD estimate may also be used to estimate the same transfer function $H_{pf}$. It should be noted that any suitable estimation method may be used without departing from the teachings of acoustic reverberation process 10.

In some embodiments, acoustic reverberation process 10 may include determining at least one impulse response characteristic. Accordingly, the near-talk channel may be used to improve the distant talk ASR system in order to learn the room impulse responses characteristics, which may then be further exploited. Thus, the impulse response of the room may be determined and any distortions created by the room may be accounted for as necessary. Other embodiments may involve determining the impulse response of other areas (e.g. the inside of a vehicle, which may utilize acoustic reverberation process 10, etc.). Determining the impulse response may be achieved using one or more microphones, which may be configured to record information such as audio data (e.g., a user's speech or some pre-recorded signal) in order to determine the impulse response. The microphones may be in communication with one or more computing devices, such as those described herein, which may be configured to calculate the impulse response. The nature and configurations of the microphones are discussed in further detail below.

Embodiments disclosed herein may be configured to support speech input via multi channel array microphones. In this way, television viewers may be able to sit comfortably in a living room environment and be able to speak commands, searches and messages to their television (e.g. television 43) via array microphones. The array may be configured to distinguish between users and the noise emanating from the television or other entertainment sources. In some embodiments, the array may be configured to follow speakers around the living room via visual input if they move from one seat to another, and should also support multiple speakers in the living that are sitting in different locations (in this case the system may be able to signal to the people in the room which person it is listening to at any particular moment). In some cases, this may be achieved using facial or gesture recognition technology. The system may also support a setting in which it can accept input from a restricted user set, in which case it may ignore all other speakers, or any user set, in which it listens to any user that speaks. The concept of voice biometrics may be explored to identify the user set. The system may also adapt to frequent speakers, of various ages and both genders, over time to improve overall performance.

In some embodiments, acoustic reverberation process 10 may include optimizing the system using spatial filtering. More specifically, the near-talk channel may be used to improve the far-talk ASR system by optimizing one or more beam-forming settings. For example, when an array of microphones is used the near-talk channel may provide results that may be used to tune the system.

It should be noted that the microphones associated with the embodiments of the present disclosure may be of any suitable design. Further, the microphones may be located in numerous electronic devices in addition to the near-talk and far-talk devices described herein. For example, one or more microphones may be located within a remote control device, a cellphone, tablet computing device, television, set-top-box, receiver, an in-vehicle system, and a hands-free telephone system, etc.

As discussed above, the near-talk channel often is available as an alternative channel in some applications such as a speech TV remote control with an additional built-in microphone or a head set in the case of distant-talk speech recognition software application. In other applications, an alternative additional channel is not readily available. In such an implementation, embodiments described herein may allow for the use of a smart phone or any other device.

Figure 12:
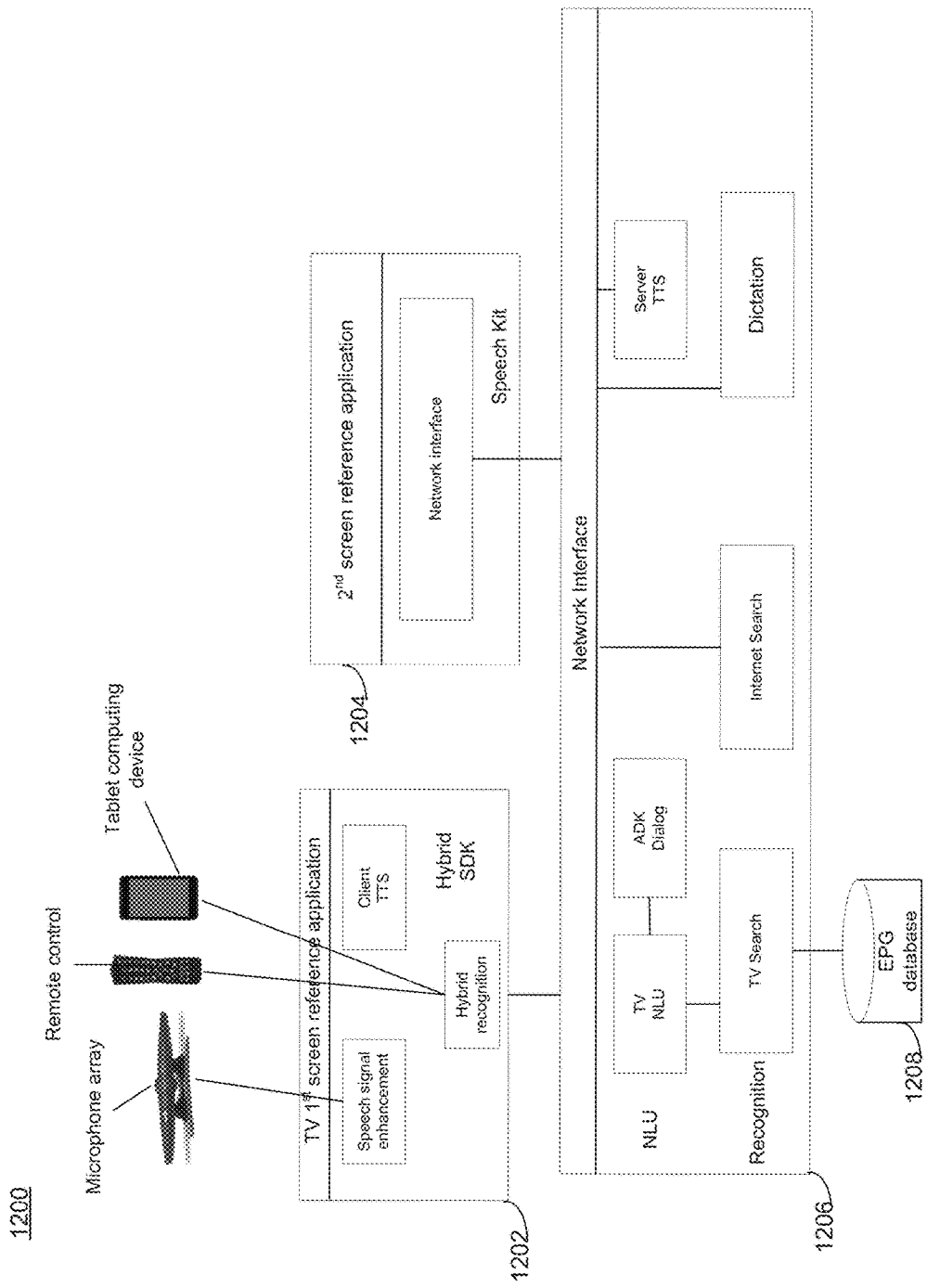
FIG. 12 is a diagrammatic view of a system configured to implement an acoustic reverberation process in accordance with an embodiment of the present disclosure.

Referring now to FIG. 12, an embodiment depicting a high-level architecture of an example system 1200 configured to implement Acoustic reverberation 10 is provided. System 1200 may include far-talk device 1202, near-talk device, 1204, server computing device 1206, and storage device 1208. In this particular example, far-talk device 402 may correspond to a television or set-top-box while near-talk device 1204 may correspond to a cellphone, tablet, remote control, or other suitable device. Devices 1202 and 1204 may communicate with server computing device 1206 using an associated network interface.

Embodiments of acoustic reverberation process 10 may utilize stochastic data models, which may be trained using a variety of domain data. Some modeling types may include, but are not limited to, acoustic models, language models, NLU grammar, etc.

Figure 13:
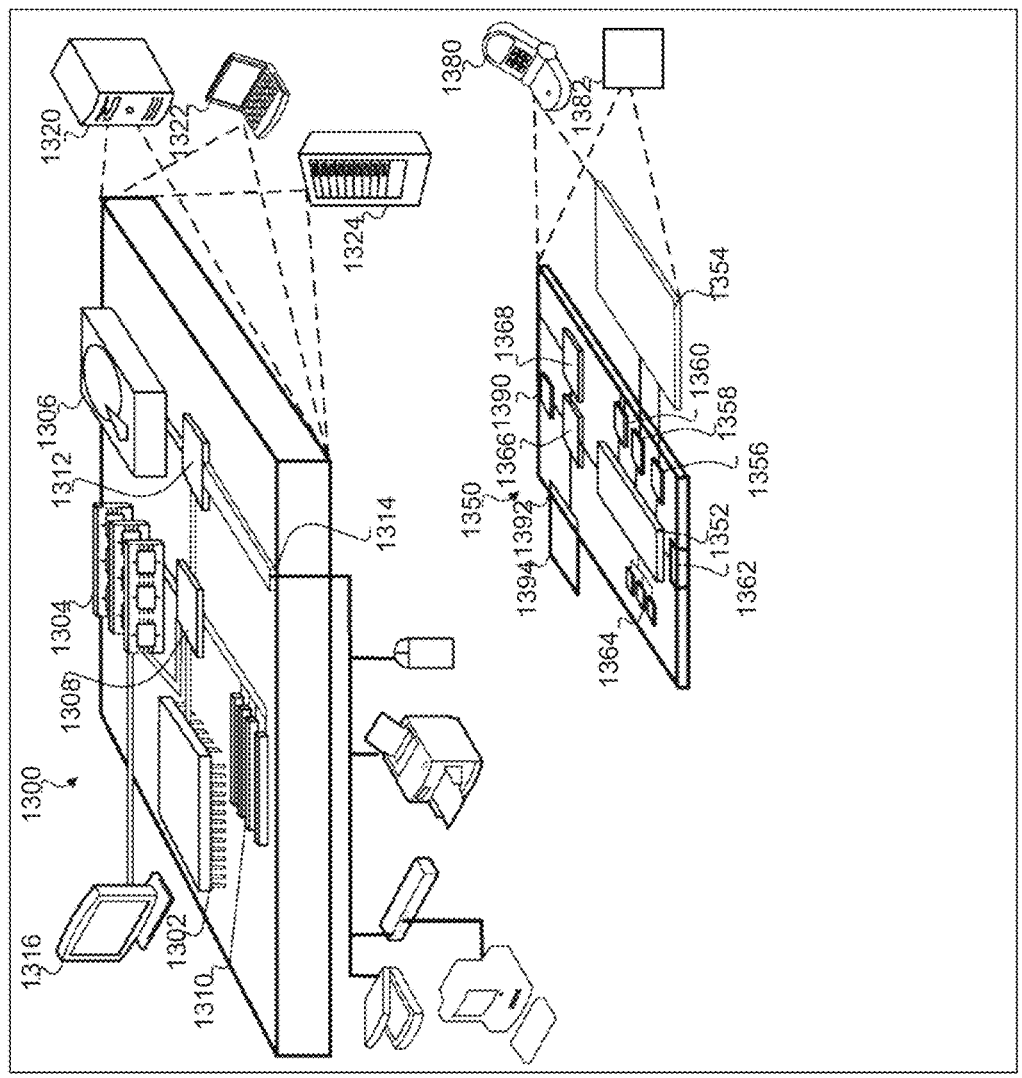
FIG. 13 shows an example of a computer device and a mobile computer device that can be used to implement the techniques described here.

Referring now to FIG. 13, an example of a generic computer device 1300 and a generic mobile computer device 1350, which may be used with the techniques described here is provided. Computing device 1300 is intended to represent various forms of digital computers, such as tablet computers, laptops, desktops, workstations, personal digital assistants, servers, blade servers, mainframes, and other appropriate computers. In some embodiments, computing device 1350 can include various forms of mobile devices, such as personal digital assistants, cellular telephones, smartphones, and other similar computing devices. Computing device 1350 and/or computing device 1300 may also include other devices, such as televisions with one or more processors embedded therein or attached thereto as well as any of the microphones, microphone arrays, and/or speakers described herein. The components shown here, their connections and relationships, and their functions, are meant to be exemplary only, and are not meant to limit implementations of the inventions described and/or claimed in this document.

In some embodiments, computing device 1300 may include processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, may be interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

Memory 1304 may store information within the computing device 1300. In one implementation, the memory 1304 may be a volatile memory unit or units. In another implementation, the memory 1304 may be a non-volatile memory unit or units. The memory 1304 may also be another form of computer-readable medium, such as a magnetic or optical disk.

Storage device 1306 may be capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, memory on processor 1302, or a propagated signal.

High speed controller 1308 may manage bandwidth-intensive operations for the computing device 1300, while the low speed controller 1312 may manage lower bandwidth-intensive operations. Such allocation of functions is exemplary only. In one implementation, the high-speed controller 1308 may be coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 may include a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, may be interconnected using various buses, and several of the components may be mounted on a common motherboard or in other manners as appropriate.

Processor 1352 may execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

In some embodiments, processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

In some embodiments, memory 1364 may store information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 1364, expansion memory 1374, memory on processor 1352, or a propagated signal that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MIMS speech recognition, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

Computing device 1350 may be implemented in a number of different forms, as shown in the figure. For example, it may be implemented as a cellular telephone 1380. It may also be implemented as part of a smartphone 1382, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, at one or more microphones, a first audio signal;
receiving, at the one or more microphones, a reverberation audio signal;
processing at least one of the first audio signal and the reverberation audio signal; and
limiting a model based reverberation equalizer using a temporal constraint for direct sound distortions, the model based reverberation equalizer configured to generate one or more outputs, based upon, at least in part, at least one of the first audio signal and the reverberation audio signal, wherein limiting the model based reverberation equalizer includes removing a direct sound component of at least the first audio signal to measure a direct-to-noise ratio.

2. The computer-implemented method of claim 1, further comprising: receiving the one or more outputs from the model based reverberation equalizer at a postfilter.

3. The computer-implemented method of claim 1, further comprising: receiving a beamformer output at a postfilter.

4. The computer-implemented method of claim 1, further comprising: adjusting the model based reverberation equalizer to obtain the direct-to-noise ratio.

5. The computer-implemented method of claim 4, further comprising: measuring the direct-to-noise ratio using, at least in part, at least one temporal criteria.

6. The computer-implemented method of claim 4, further comprising: using the model based reverberation equalizer for the direct-to-noise ratio as a constraint equalizer configured to limit the direct sound distortion introduced by a postfilter.

7. The computer-implemented method of claim 1, wherein the model based reverberation equalizer is configured to increase a level of suppression of reverberation by a spatial postfilter.

8. The computer-implemented method of claim 7, wherein the model based reverberation equalizer is configured to limit distortion of the direct sound and enable spatial filtering at the postfilter.

9. A system for addressing acoustic signal reverberation comprising:
one or more microphones having one or more processors configured to receive a first audio signal and a reverberation audio signal, the one or more processors further configured to process at least one of the first audio signal and the reverberation audio signal, the one or more processors further configured to limit a model based reverberation equalizer using a temporal constraint for direct sound distortions, the model based reverberation equalizer configured to generate one or more outputs, based upon, at least in part, at least one of the first audio signal and the reverberation audio signal, wherein limiting the model based reverberation equalizer includes removing a direct sound component of at least the first audio signal to measure a direct-to-noise ratio.

10. The system of claim 9, wherein the one or more processors are further configured to receive the one or more outputs from the model based reverberation equalizer at a postfilter.

11. The system of claim 9, wherein the one or more processors are further configured to receive a beamformer output at a postfilter.

12. The system of claim 9, wherein the one or more processors are further configured to adjust the model based reverberation equalizer to obtain the direct-to-noise ratio.

13. The system of claim 12, wherein the one or more processors are further configured to measure the direct-to-noise ratio using, at least in part, at least one temporal criteria.

14. The system of claim 12, wherein the one or more processors are further configured to utilize the model based reverberation equalizer for the direct-to-noise ratio as a constraint equalizer configured to limit the direct sound distortion introduced by a postfilter.

15. The system of claim 9, wherein the model based reverberation equalizer is configured to increase a level of suppression of reverberation by a spatial postfilter.

16. The system of claim 15, wherein the model based reverberation equalizer is configured to limit distortion of the direct sound and enable spatial filtering at the postfilter.

17. A computer program product residing on a non-transitory computer readable storage medium having a plurality of instructions stored thereon which, when executed across one or more processors, causes at least a portion of the one or more processors to perform operations comprising: receiving, at one or more microphones, a first audio signal from a first audio signal source; receiving, at the one or more microphones, a reverberation audio signal from a reverberation audio signal source; processing at least one of the first audio signal and the reverberation audio signal at a beamformer; and limiting a model based reverberation equalizer using a temporal constraint for direct sound distortions, the model based reverberation equalizer configured to generate one or more outputs, based upon, at least in part, at least one of the first audio signal and the reverberation audio signal, wherein limiting the model based reverberation equalizer includes removing a direct sound component of at least the first audio signal to measure a direct-to-noise ratio.

18. The computer program product of claim 17, wherein the model based reverberation equalizer includes a plurality of equalizers.

19. The computer program product of claim 18, wherein the plurality of equalizers include a noise equalizer, a model equalizer, and a constraint equalizer.

20. The computer program product of claim 19, wherein the model based reverberation equalizer includes a coherence model.

* * * * *